United States Patent [19]

Wodder et al.

[11] Patent Number: 4,787,014
[45] Date of Patent: Nov. 22, 1988

[54] SPOKE MOUNTED BICYCLE LIGHT

[76] Inventors: Terry G. Wodder, 1236 Larrabee La., Northbrook, Ill. 60062; Lawrence J. Crain, 845 Deerfield Rd., Highland Park, Ill. 60035

[21] Appl. No.: 78,710

[22] Filed: Jul. 28, 1987

[51] Int. Cl.[4] ............................................. B62J 5/00
[52] U.S. Cl. ........................................ 362/78; 362/72; 340/134
[58] Field of Search ............... 362/72, 78, 234, 249, 362/252, 296, 806; 340/134; 310/67 A

[56] References Cited

U.S. PATENT DOCUMENTS

| | | | |
|---|---|---|---|
| 2,811,633 | 10/1957 | Bjork | 362/72 |
| 3,987,409 | 10/1976 | Freeman | 340/134 |
| 4,037,925 | 7/1977 | Fleming | 350/97 |
| 4,135,229 | 1/1979 | Modurkay | 362/72 |
| 4,176,390 | 11/1979 | Galbert | 362/72 |

FOREIGN PATENT DOCUMENTS 52-25597 2/1977 Japan .................... 340/134

Primary Examiner—Tony M. Argenbright
Assistant Examiner—Eric R. Carlberg
Attorney, Agent, or Firm—Lawrence J. Crain

[57] ABSTRACT

A safety lighting device for a bicycle including a housing in which is located a self-contained light source which emits light through a lens; the housing also having a plate-like mounting apparatus wedged between pairs of overlapping spokes which allows the housing to be removably secured to the spokes, and further allows the light to be directed radially outwardly to permit ready visibility of the bike and rider while deflecting the light away from the eyes of the rider and any obstructions created by the wheel rim.

16 Claims, 3 Drawing Sheets

SPOKE MOUNTED BICYCLE LIGHT

BACKGROUND OF THE INVENTION

The present invention relates to bicycle safety devices, and, in particular, to bicycle lights which increase the night-time visibility of the bicycle and rider.

Bicycling, although a healthy, relaxing and frequently competitive pastime by day, becomes significantly more dangerous at night. Recent studies by the National Highway Traffic Safety Administration conclude that although it comprises only approximately 4 percent of total cycling activity, night-time riding accounts for 42 percent of all cycling fatalities. Thus it is approximately 10 times more likely for a cyclist to be killed while riding at night than during the day.

A significant percentage of those night-time fatalities is the result of collisions between automobiles and young riders under the age of 14. Very often, motorists involved in bicycle collisions claim that they were unable to see the cyclist-victim in time to avoid the collision.

In an effort to stem this rising tide of fatalities, most jurisdictions have passed statutes which require all cycles to be equipped with front, side and rear reflectors. Unfortunately, these reflectors provide a limited reflective surface area and are detectible by motorists at a distance of 1000 feet away on a clear night. Quite often, when a motorist finally realizes there is a bicycle ahead, it is too late to take evasive action.

Conventional bicycle lights fall into two broad categories, generator powered, and battery powered. Although they offer greater visibility than reflectors, generators often only provide a thin rear beam. Moreover, generators are often unreliable, relatively expensive, and undesirable for use by younger riders due to the drag they place on the wheel.

Battery-powered lights offer the advantages of lower initial cost and higher reliability, but often are not as visible as are generators. Some types of battery-powered bicycle lights are designed to be detachable from the bike to double as flashlights. A drawback of these latter devices is that the require separate brackets which must be accurately and often fairly permanently positioned on the frame or handle bars of the bicycle. Alternately, battery-powered lights have been designed to be strapped to the arms, legs, torso or helmet of the rider. These latter devices are usually uncomfortable to wear and provide a limited amount of visibility.

U.S. Pat. No. 3,987,409 discloses a bicycle light designed to provide a source of moving light by employing a plurality of battery-powered lights permanently mounted to the spokes so as to be visible from the side. Although the concept of moving lights increases visibility, this apparatus is cumbersome to install and maintain in that it calls for elaborate wheel covers. Furthermore the devices must be dismantled before batteries can be replaced.

Regardless of the above mentioned safety statistics, and the wide variety of bicycle lights currently available, younger riders very often feel a sense of invulnerability on the road, and as such do not wish to be bothered with conventional lights of any type. Members of this high risk group should have access to a light which is both enjoyable and exciting to use to insure that it will be employed on night-time rides. The ideal bicycle light should also be inexpensive to be affordable to young riders.

Thus, there is a need for a low cost bicycle safety light which renders the cyclist highly visible to motorists, which is easy to install and maintain, and which will be accepted for long term use by younger riders.

Consequently, it is a major objective of the present invention to provide a bicycle light which transforms the cyclist into a highly visible object.

It is another object of the present invention to provide a spoke mounted bicycle light which is secured to, and by, the spokes of a bicycle wheel.

It is still another object of the present invention to provide a spoke mounted bicycle light which produces a radially directed beam of light.

It is a further object of the present invention to provide an economical bicycle light which will be accepted for use by younger riders.

SUMMARY OF THE INVENTION

The present invention relates to bicycle lights designed to be mounted to the spokes of a conventional thin-wire spoked wheel having a plurality of pairs of crossed-over spokes. More specifically, the present bicycle light includes a plate-like mounting means designed to position a light source such as a small flashlight or the like in the spokes to direct a beam of light radially-outwardly and unobstructed by the wheel rim. The mounting means is designed to be detachable from the spokes, and the light source is designed to be detachable from the mounting means.

The present mounting means include a substantially flat plate-like piece constructed and arranged to be inserted or wedged between adjacent pairs of crossed-over spokes. Additional fastening means such as hooks or threaded fasteners may be provided to the plate as necessary to allow it to maintain its position when subject to the centrifugal force of a rotating wheel.

In addition, the plate-like mounting means may be provided with means to deflect the beam of light away from the obstructing rim.

BRIEF DESCRIPTION OF THE DRAWINGS

The novel features and advantages of the present invention will become more apparent upon a review of the drawings, in which.

DESCRIPTION OF THE PREFERRED EMBODIMENT

Figure 1:
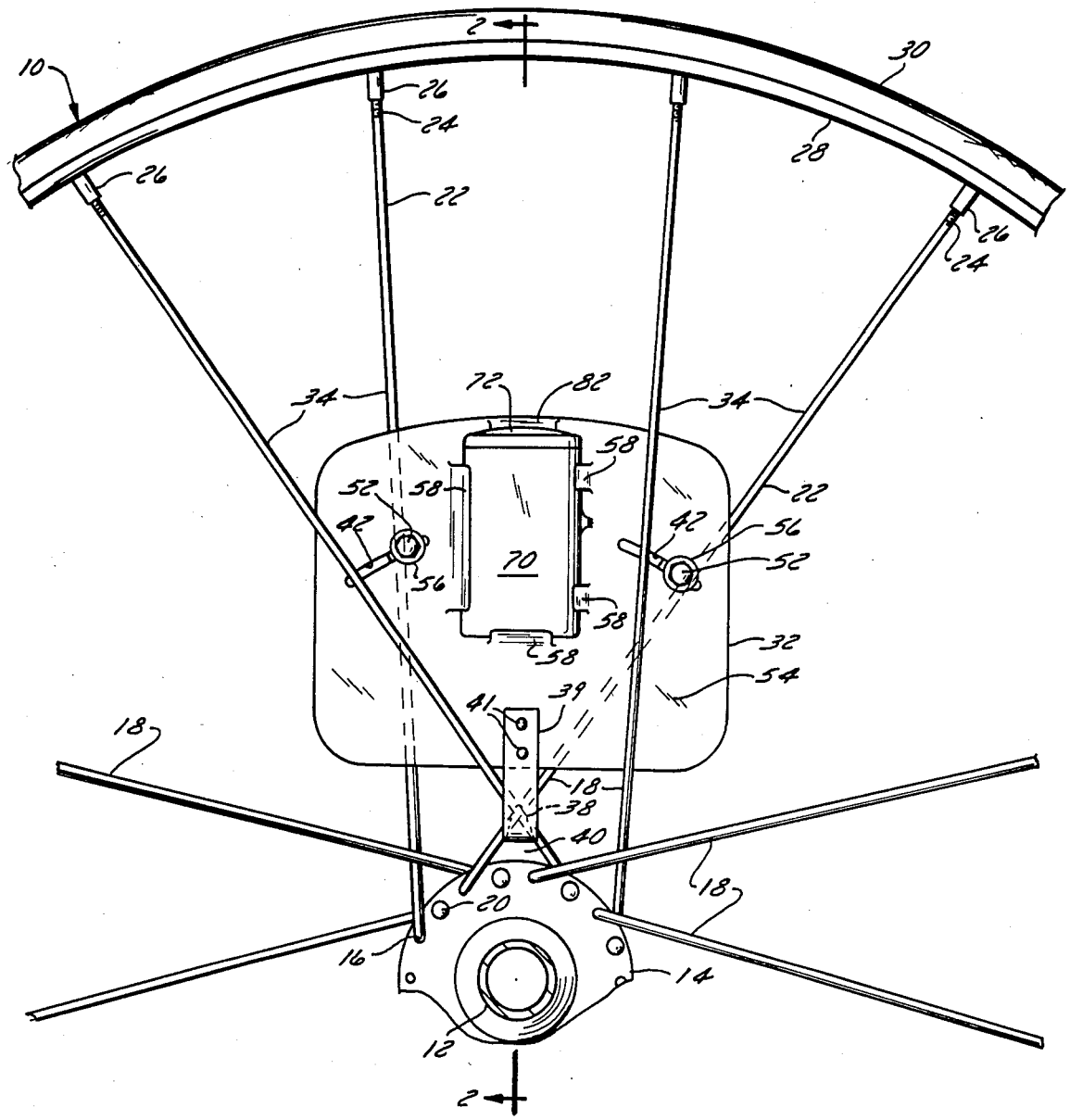
FIG. 1 is a fragmentary side elevation of the interior of a bicycle wheel fitted with the spoke mounted light of the present invention.

Referring now to the drawings, wherein like reference numerals designate like characteristics, FIG. 1 depicts a conventional bicycle wheel 10 comprised of hub 12 with hub flange 14. Hub flange 14 is provided with a plurality of regularly spaced spoke eyelets 16, through each of which is threaded one of a like plurality of wire spokes 18. Each spoke is comprised of a head portion 20, an elongate shaft portion 22 and a threaded end 24. Threaded end 24 is secured to threaded spoke nipple 26 which is inserted through apertures in wheel rim 28. A tire 30 is mounted to wheel rim 28 in conventional fashion.

Figure 2:
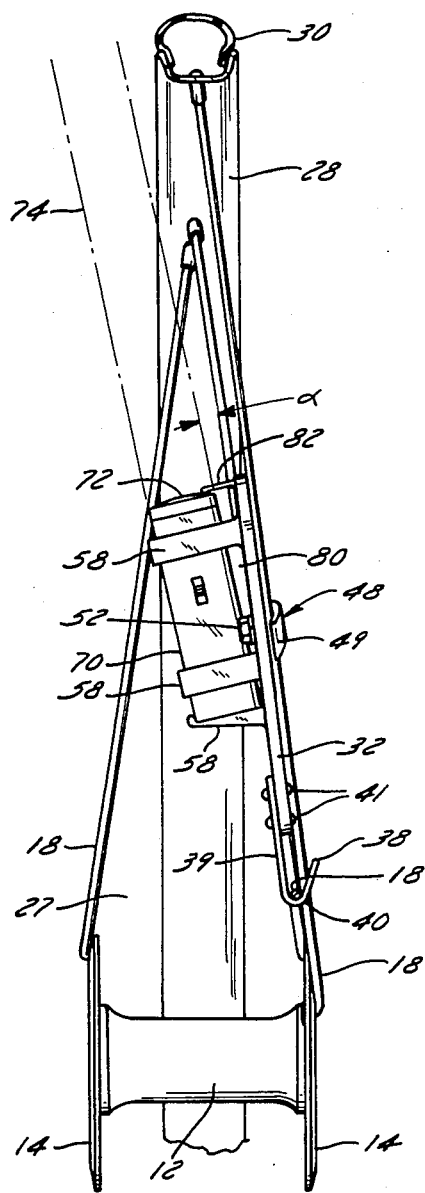
FIG. 2 is an elevation in partial section, taken along line 2—2 of FIG. 1 in the general direction indicated.

Spokes 18 are laced into rim 28 in one of a number of conventional patterns selected for a specific combination of strength and resiliency. The spoke lacing pattern pictured in FIG. 1 is one in which each spoke 18 crosses over three other spokes before it reaches nipple 26. Regardless of the lacing pattern, spokes 18 from each end of hub 12 create an inner space 27 which is triangularly shaped in section, as shown in FIG. 2.

The mounting plate 32 of the present invention is designed to be inserted between adjacent pairs 34 of crossed-over spokes 18, so that a light source mounted thereon may be located within space 27 to prevent interference with the operation of wheel 10. Plate 32 is a substantially thin, flat piece of rigid material such as sheet metal or suitable polymeric substitute. Although it is shown having an oval configuration, plate 32 must be provided with a shape long enough to span adjacent pairs 34 of crossed-over spokes 18.

Although the adjacent pairs 34 of spokes 18 provide substantial gripping force, means must be provided to maintain the plate's position on wheel 10 in the face of centrifugal force.

Figure 3:
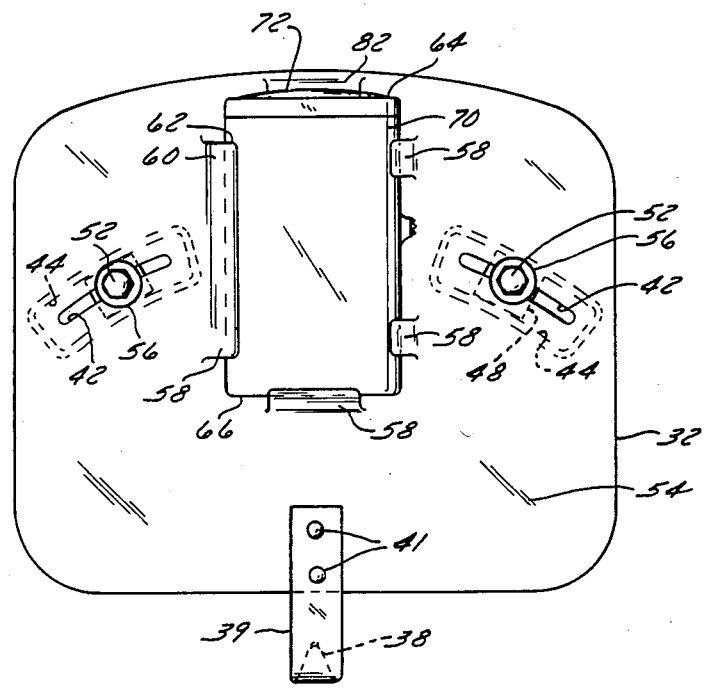
FIG. 3 is an enlarged front elevation of the present invention as depicted in FIG. 1.

As wheel 10 rotates, centrifugal force will push plate 32 toward wheel rim 28. Consequently, a supplemental plate retaining means should be provided. This retaining means may take the form of a rigid hook 38 designed to grip a crossed-over pair of spokes 18 near hub 12 at position 40. Hook 38 may be fabricated from a strip of flat material 39 and attached to plate 32 by any suitable conventional means, such as adhesives, welding, threaded fasteners, or the rivets 41 pictured in FIGS. 1 and 3.

Figure 4:
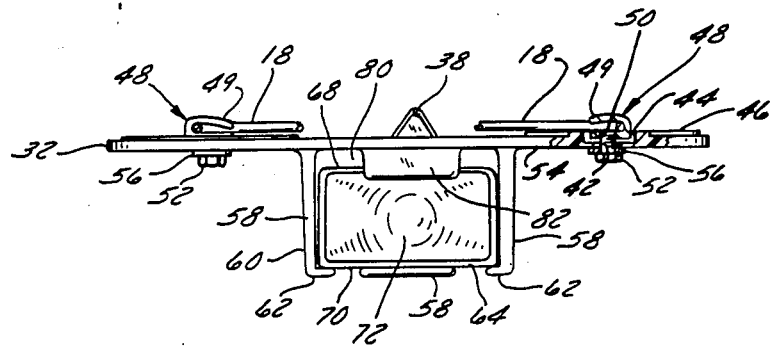
FIG. 4 is a plan view of the bicycle light of the present invention.
Figure 5:
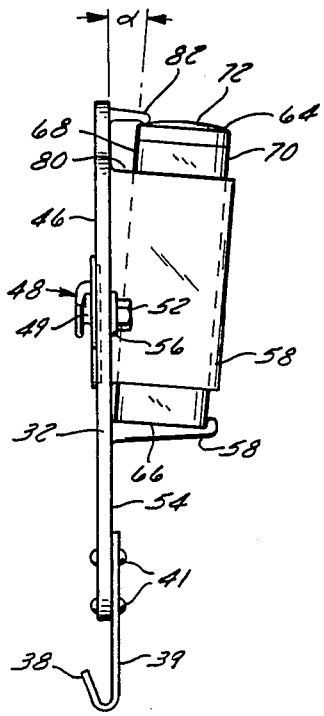
FIG. 5 is a side elevation of the present invention as depicted in FIG. 3.

As an alternate plate retaining means, plate 32 may be provided with a pair of curved slots 42. Each slot 42 is provided with a length and configuration to engage one of the members of each pair 34 of spokes 18 between which plate 32 is inserted. Slots 42 are provided with a countersunk recessed area 44 on the underside 46 of plate 32 (best seen in FIG. 4). Recess 44 is dimensioned to slidably accept a hook means 48 which is constructed and arranged to grip a spoke 18 in its hook end 49. Hook 48 is also provided with a threaded bore 50 dimensioned to accept machine screw 52. Machine screw 52 is inserted through slot 42 from the front 54 of plate 32. A washer 56 may also be provided. Machine screw 52 is threaded through slot 42 and into bore 50 to press spoke 18 against hook 48. Mounting plate 32 may be secured to wheel 10 by means of hook 38, threaded hook means 48, or a combination of the two.

Plate 32 is also provided with a plurality of clamps 58 which are either fastened or integrally secured to the plate front 54. Clamps 58 may be manufactured from any suitable rigid, yet resilient material, and comprise a vertical portion 60, and a horizontal portion 62, joined to the top of portion 60 in an 'L' shape (best seen in FIG. 4). Clamps 58 are provided in sufficient number and strength to secure the top 64, bottom 66 and back end 68 of light 70 to plate 32.

The preferred type of light 70 is a conventional, compact, battery-powered flashlight having a generally rectangular box-type configuration, although other configurations and power sources are acceptable, as long as the light 70 may be retained within space 27 without exerting undue stress upon spokes 18 or wheel 10. Light clamps 58 may be specially designed to accommodate and securely retain specific configurations of light 70 to plate 32.

Referring now to FIG. 2, light 70 is shown mounted to wheel 10 via plate 32. It is evident that, depending upon the exact position of plate 32 upon spokes 18, wheel rim 28 may block the beam of light 74 emitted from lens 72 of light 70. This obstruction may reduce the night-time visibility of a cyclist using a spoke mounted light.

To alleviate this problem, a deflecting wedge means 80 is secured to the top side 54 of plate 32 near the edge where light lens 72 is located. Wedge means may be any type of material or provided in any shape which will give light beam 74 a degree of elevation above the plane of plate 32. Although wedge means 80 is designed to elevate light 70 so that beam 74 is not obstructed by wheel rim 28, it has been found that an elevation measured by angle in the range of 5° to 20° is suitable.

Wedge means 80 may also be provided with a vertically projecting lip 82 which is dimensioned to prevent light 70 from moving toward rim 28 as a result of centrifugal force. Mounting plate 32 may also be provided with a lip 82 if wedge means 80 is not employed.

In operation, plate 32 is placed into wheel inner space 27 and positioned upon spokes 18 so that plate top side 54 faces inward. The side edges of plate 32 are each wedged between the members of a pair 34 of overlapping spokes 18. Additional fastening means may be provided in the form of rigid hook 38, which grips a third pair of overlapping spokes at position 40, and/or by threaded hooks 48 each of which are clamped to a spoke 18.

Once plate 32 is secured to the wheel 10, light 70 is secured thereto by clamps 58 or a suitable adhesive. Wedge means 80 may be provided to direct light beam 74 away from wheel rim 28. A lip 82 may be provided to wedge 80 or plate 32 to further secure light 70 to plate 32.

At night, a cyclist using at least one light and mounting plate of the present invention on at least one wheel of the bicycle, will become highly visible due to the rapidly moving, radially directed beam of light. In addition, the spectacular visual effect of the present invention will be especially appealing to younger riders.

Although various embodiments of the present bicycle light have been shown and discussed, it will become obvious to those skilled in the art that departures can be made with regard to various components without departing from the spirit and scope of the claims.

What is claimed is:

1. A lighting device designed to be mounted on a bicycle of the type having a frame and a pair of wheels, each said wheel including a rim, a hub and a plurality of spokes connecting said rim to said hub, said spokes arranged on said wheels so as to be in a specified crossed over relationship with each other, said lighting device comprising:

a housing having a lens;

a self-contained light located within said housing and designed to emit a directed beam of light through said lens;

means for releasably mounting said housing to said spokes on at least one of said wheels, said mounting means including a plate having a center portion adapted so that said housing may be secured thereto and two side edge portions, each of said edge portions adapted to be wedgingly inserted between a respective pair of crossed over spokes of said wheel; and means for deflecting at least a portion of said light beam emitted through said lens so that as said wheel rotates, said beam of light is substantially deflected away from said wheel rim.

2. The device defined in claim 1 wherein said housing is designed to be mounted on said wheel so that said lens directs a source of light toward the rim of said wheel.

3. The device defined in claim 2 wherein said source of light can be directed to either side of said wheel rim.

4. The device defined in claim 1 wherein each of said side edge portions include spoke clamping means to secure said portion between said crossed over spokes.

5. The device defined in claim 4 wherein said spoke clamping means included threaded fasteners and threaded hook means, said fasteners adapted to engage said hook means so that said fastener clamps one of said spokes against said hook means.

6. The device defined in claim 1 wherein said mounting means further includes central spoke clamping means located on said central portion of said plate.

7. The device defined in claim 6 wherein said central spoke clamping means includes a hook constructed and arranged to engage a pair of said spokes crossed over each other at a location near said hub to prevent the movement of said plate toward said wheel rim as a result of centrifugal force generated by the rotation of said wheel.

8. The device defined in claim 1 wherein said housing is detachable from said plate.

9. The device defined in claim 1 wherein said beam deflecting means include a wedge located on said plate.

10. A spoke mounted lighting device designed to be mounted in the spokes of a bicycle wheel of the type having a rim, a hub and a plurality of spokes connected therebetween so that pairs of said spokes are located in crossed-over arrangement to each other, said device comprising:

a housing having a lens;

a self-contained, battery-powered light assembly located within said housing and designed to emit a directed beam of light through said lens;

mounting means for releasably mounting said housing to said spokes, said mounting means including a substantially flat plate with a central portion having at least one clamp designed to releasably secure said housing to said plate, and two side edge portions, each said edge portion designed to be wedgingly inserted between a respective pair of said crossed-over spokes; and means on said plate for deflecting said beam so that as said wheel rotates, said beam is deflected away from said rim.

11. The device defined in claim 10 wherein each of said side edge portions is provided with spoke clamping means to secure said plate between adjacent pairs of said crossed-over spokes.

12. The device defined in claim 11 wherein said spoke clamping means include threaded fasteners and threaded hook means, each of said fasteners adapted to engage threaded hook means so that said fastener clamps one of said spokes against said hook means.

13. The device defined in claim 10 wherein said central portion of said plate is provided with spoke clamping means.

14. The device defined in claim 13 wherein said central spoke clamping means is a hook constructed and arranged to engage a pair of said spokes crossed over each other at a location near said hub to prevent the movement of said plate toward said wheel rim as a result of centrifugal force generated by the rotation of said wheel.

15. The device defined in claim 10 wherein said beam of light is projected radially outwardly.

16. The device defined in claim 10 including two of said lights mounted to a diameter of said wheel.

* * * * *